No. 777,203.

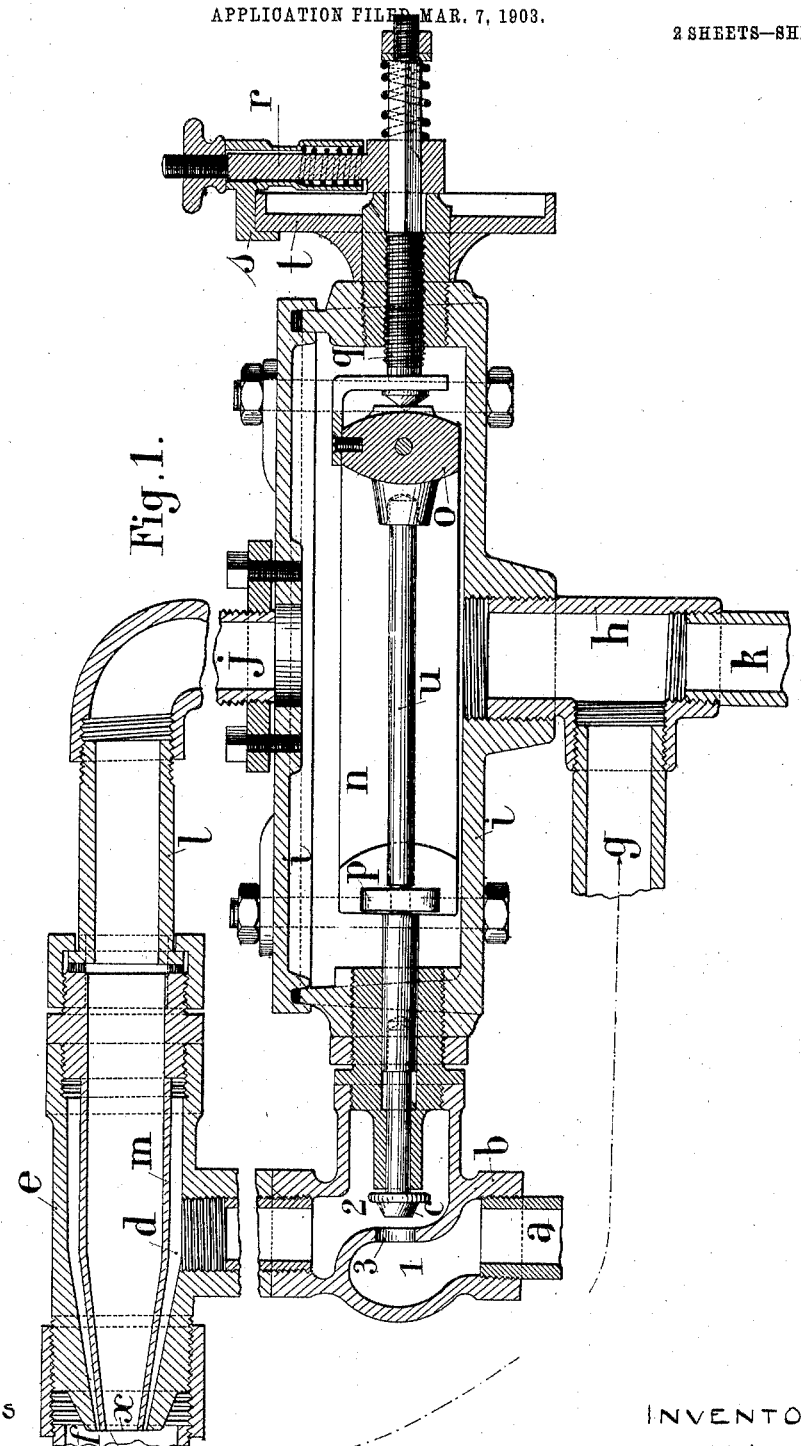

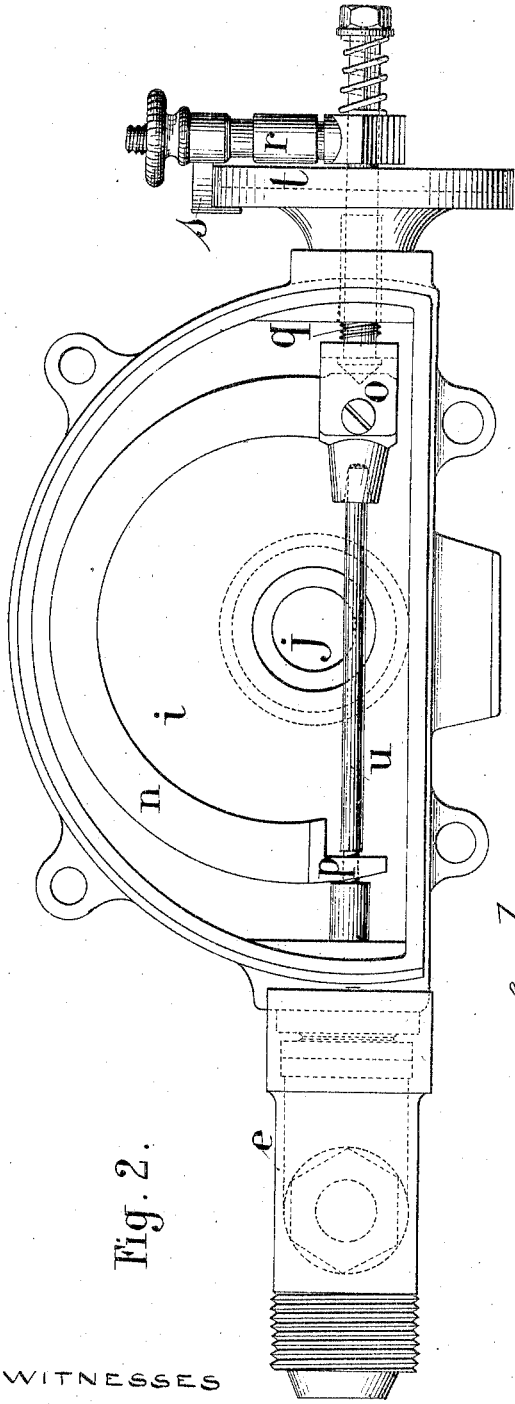
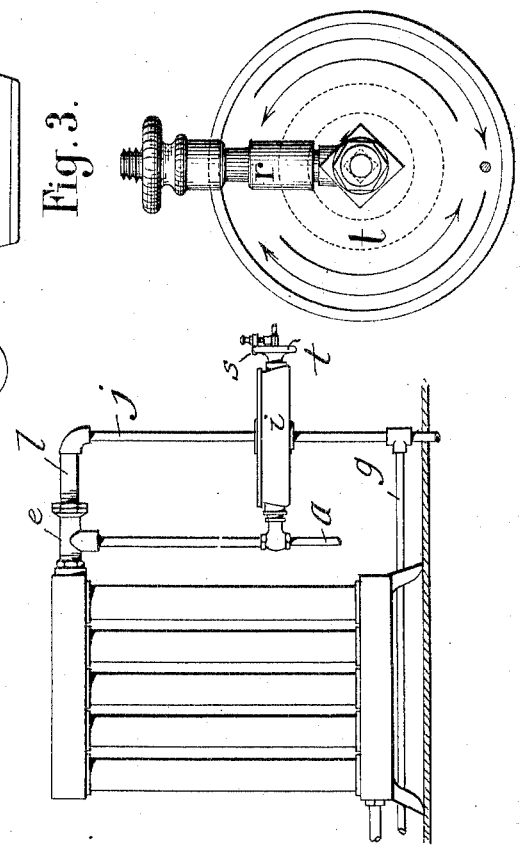

Patented December 13, 1904.

UNITED STATES PATENT OFFICE.

ANTOINE HEINTZ, OF HERSTAL-LEZ-LIÈGE, BELGIUM.

APPARATUS FOR REGULATING THE CIRCULATION IN INSTALLATIONS FOR HEATING BY STEAM.

SPECIFICATION forming part of Letters Patent No. 777,203, dated December 13, 1904.

Application filed March 7, 1903. Serial No. 146,702. (No model.)

*To all whom it may concern:*

Be it known that I, ANTOINE HEINTZ, engineer, of Herstal-lez-Liège, in the Kingdom of Belgium, have invented a certain new and useful Apparatus for Regulating the Circulation in Installations for Heating by Steam; and I do hereby declare the following to be a full, clear, and exact description of the invention, such as will enable others skilled in the art to which it appertains to make and use the same.

The invention which is the subject of the present application for a patent refers to a device for regulating the circulation in installations of apparatus for heating by steam. This arrangement easily adapts itself to pipes in which the steam circulates and serves at the same time as an automatic steam-trap, a regulator, and a purifier.

The invention consists in regulating the admission of steam by an expansible fluid-escape check, of which the operating-organ is placed in a chamber through which air is drawn by the influence of escaping gases.

The apparatus consists of an expansion-plug forming a regulating-valve for the incoming steam, and of which the operating-organ is placed in a chamber which communicates on the one side with the atmosphere by means of a pipe into which is led the end of the discharge-pipe of the heating apparatus and is on the other side connected to an air-ejector which receives the steam on its entrance.

The accompanying drawings show as a representative example a practical form for the carrying out of my invention.

Figure 1 is a longitudinal section of the whole apparatus. Fig. 2 is a plan with the cover removed. Fig. 3 is an end elevation of a detail. Fig. 4 is a view of the device attached to the radiator.

In the figures, $a$ represents the pipe through which the steam enters.

$b$ is a junction in which the two chambers 1 and 2 communicate by means of an orifice 3, which is opened and shut by a plug $c$, according to the temperature to which the operating-organ of this latter is subjected. The chamber 1 is connected to the admission-pipe $a$. Chamber 2 communicates with the annular channel $d$ of the air-ejector $e$. From this channel the steam flows through $f$ into the heating apparatus and emerges eventually through $g$ into the junction $h$, which is screwed to the chamber $i$, which incloses the operating-organ and which is in communication with the atmosphere by means of $k$. To this same chamber $i$ is connected the mouth of the pipe $l$, which leads to the inspiring region of the air-ejector.

The heat-regulator which operates the plug $c$ is of any known construction. The drawings represent a curved flexible steel tube $n$, filled with naphtha or any other substance which expands easily, and this is hermetically sealed at its two ends $o$ and $p$ by two terminals. The terminal $o$ is attached to the end of a regulating-screw $q$, which can be adjusted by means of a carrier $r$, provided with an index $s$, moving on a disk $t$. The extremity $p$ of the tube $n$ is fixed on a squared or narrowed portion of rod $u$, said rod $u$ having its rear end fitting movable in a socket $u'$ in the part $o$. Thus when the tube expands the rod $u$ is caused to slide, and thus operate the plug $c$. By means of the screw $q$ the position of the tube $n$ can be regulated in such a way that the plug closes the orifice 3 when the temperature in the chamber $i$ reaches a predetermined point. As is easy to be seen, the temperature in the chamber $i$ is always that of the discharge-passage $g$ $k$, with which this chamber communicates, and this is one of the essential features of my apparatus. The entrance of the steam into the pipes of heating or distribution is regulated by the temperature in the discharge-pipe. Besides this, the ejector $e$, which receives the steam at $d$ from the admission-pipe, draws into the chamber $i$ from one side fresh atmospheric air through $k$ and also all the steam or foul gases coming through $g$ from the heating-pipes. What escapes by $x$ through the cone of the ejector is thus a mixture of steam under pressure, air, and foul gases. The heat-regulator operating on the incoming steam and being at the same time in communication with the atmosphere by the discharge-pipe and with the air-ejector thus performs simultaneously the functions of a regulating-valve, a steam-trap, and a purifier. For example, when in working order the steam admitted to $a$ by means of a stop-cock (not shown) finding the orifice 3 open escapes by the pipe $d$ of the ejector. It immediately draws in the exterior air through $k$ and the chamber $i$ and conveys it along the pipe, which terminates at $g$. The condensed steam impelled by the influx of steam will flow through $k$ by its own weight. At the same time the gases disengaged from this water are drawn in with the outside air. The heat contained in these gases is thus recovered, and the escape of the gases to the air is prevented. This is a double advantage, of which the importance is evident, especially in the heating of railway-trains. After the commencement of the heating, as soon as the pipes are clear of condensed steam and when the temperature in the whole circuit is at the desired height, according to the scale on the disk $t$, the tube $n$ will under the influence of the temperature of the discharge-pipe have so expanded as to close the orifice 3, and thus stop the admission of steam. At this time the interior pressure in the pipe will be less than the atmospheric pressure, several degrees of vacuum will be formed in the tubes, and thus fresh air will be drawn through $h$ into the chamber $i$ and cool the tube $n$, causing it to contract and again opens the orifice 3. This continuous circulation of steam with air-suction establishes a current which drives away the condensed steam and affords, in short, the following advantages: First, congealing is impossible; second, the escape of gases particularly disagreeable and dangerous in the heating arrangements in trains is prevented; third, the heat contained in these gases is conserved; fourth, the noise of the water-hammer at starting is prevented; fifth, it insures rapidly an absolutely regular temperature and one easy to regulate throughout the installation; sixth, the steam being kept at atmospheric pressure whatever may have been the original pressure the bursting of tubes and plates at the joints is entirely prevented.

The details of construction—such as the nature of the heat-regulator and the way it is regulated, the shape and the dimensions of the ejector, &c.—can be varied without altering the principle of my invention.

I claim—

In a heating system the combination with the heating-pipe, of an injector for injecting mingled air and steam into said pipe, a steam-supply pipe for admitting steam to said injector, an air-supply passage leading to said injector and having communication with both the outside air and the return from said heating-pipe, a thermostat located in said passage and operated by the mingled fluid entering the passage from the return-pipe and atmosphere, and a valve governing the passage of steam through the steam-pipe, said valve being operatively connected to the thermostat, substantially as described.

In testimony whereof I have hereunto set my hand in the presence of two subscribing witnesses.

ANTOINE HEINTZ.

Witnesses:
GUSTAVE E. GEISLER,
DESIRÉ SIMENON.